(12) United States Patent
Huang et al.

(10) Patent No.: US 10,809,891 B2
(45) Date of Patent: Oct. 20, 2020

(54) METHOD AND APPARATUS FOR UPLOADING PHOTOGRAPHED FILE

(71) Applicant: Tencent Technology (Shenzhen) Company Limited, Shenzhen (CN)

(72) Inventors: Qin Huang, Shenzhen (CN); Yongxiang Gao, Shenzhen (CN); Yi Xu, Shenzhen (CN)

(73) Assignee: TENCENT TECHNOLOGY (SHENZHEN) COMPANY LIMITED, Shenzhen. Guangdong Province (CN)

( * ) Notice: Subject to any disclaimer, the term of this patent is extended or adjusted under 35 U.S.C. 154(b) by 0 days.

(21) Appl. No.: 16/205,758

(22) Filed: Nov. 30, 2018

(65) Prior Publication Data
US 2019/0095067 A1 Mar. 28, 2019

Related U.S. Application Data

(63) Continuation-in-part of application No. PCT/CN2017/087910, filed on Jun. 12, 2017.

(30) Foreign Application Priority Data

Jul. 13, 2016 (CN) .......................... 2016 1 0549916

(51) Int. Cl.
*G06F 3/0482* (2013.01)
*G06F 3/0484* (2013.01)
(Continued)

(52) U.S. Cl.
CPC .......... *G06F 3/0484* (2013.01); *G06F 3/0481* (2013.01); *G06F 16/51* (2019.01);
(Continued)

(58) Field of Classification Search
CPC .................................................... G06F 3/0482
(Continued)

(56) References Cited

U.S. PATENT DOCUMENTS 9,405,964 B1 * 8/2016 Suchland ........... G06K 9/00288
9,460,123 B1 * 10/2016 Strutt ................. G06F 16/5838
(Continued)

FOREIGN PATENT DOCUMENTS

CN  101489036 A  7/2009
CN  102346721 A  2/2012
(Continued)

OTHER PUBLICATIONS

Tencent Technology, ISRWO, PCT/CN2017/087910, Sep. 1, 2017, 7 pgs.
(Continued)

*Primary Examiner* — Daniel Rodriguez
(74) *Attorney, Agent, or Firm* — Morgan, Lewis & Bockius LLP

(57) ABSTRACT

A device displays a user interface of the social network platform, including status updates of users, a photo uploading region, and an input region for entering status updates of a user. The device presents recommended photos for upload in the photo uploading region. The recommended photos are selected by dividing photos in the photo library into one or more groups based on photographing location and photographing time, where, if a photographing location of a photo is not a regular location associated with a user of the device, the photo is grouped based on a common photographing location, and if the photographing location of the photo is a regular location associated with the user of the device, the photo is grouped based on a common photographing time. Photos are selected from at least one group as a recommended photo in the photo uploading region.

17 Claims, 6 Drawing Sheets

(51) Int. Cl.
*H04L 29/08* (2006.01)
*G06F 3/0481* (2013.01)
*G06Q 50/00* (2012.01)
*H04N 1/00* (2006.01)
*G06F 16/51* (2019.01)

(52) U.S. Cl.
CPC ............ *G06Q 50/01* (2013.01); *H04L 67/10* (2013.01); *H04L 67/306* (2013.01); *H04N 1/00156* (2013.01); *H04N 1/00461* (2013.01); *G06F 3/0482* (2013.01); *H04L 67/06* (2013.01)

(58) Field of Classification Search
USPC .......................................................... 715/745
See application file for complete search history.

(56) References Cited

U.S. PATENT DOCUMENTS

| | | | | |
|---|---|---|---|---|
| 2009/0254614 | A1* | 10/2009 | Brush | H04N 21/4788 709/204 |
| 2010/0174993 | A1* | 7/2010 | Pennington | G06F 1/1684 715/738 |
| 2011/0066588 | A1* | 3/2011 | Xie | G06N 5/02 706/58 |
| 2012/0117473 | A1* | 5/2012 | Han | G06F 3/0483 715/723 |
| 2013/0148864 | A1* | 6/2013 | Dolson | G06F 16/58 382/115 |
| 2013/0194438 | A1* | 8/2013 | Sweet, III | G06F 16/583 348/207.1 |
| 2014/0016872 | A1* | 1/2014 | Chao | G06F 16/51 382/218 |
| 2014/0181205 | A1* | 6/2014 | Sherrets | G06Q 50/01 709/204 |
| 2015/0215573 | A1* | 7/2015 | Hast | H04N 21/2743 348/231.2 |
| 2015/0363640 | A1* | 12/2015 | Meyer | G06Q 10/10 382/224 |
| 2016/0110355 | A1* | 4/2016 | Charania | G06F 16/58 382/224 |
| 2017/0093780 | A1* | 3/2017 | Lieb | G06T 3/40 |
| 2018/0189894 | A1* | 7/2018 | Hong | H04M 1/725 |
| 2018/0349416 | A1* | 12/2018 | Circlaeys | G06K 9/00677 |
| 2018/0367838 | A1* | 12/2018 | Li | H04N 21/4788 |
| 2019/0333161 | A1* | 10/2019 | Murphy-Chutorian | G06F 16/5838 |

FOREIGN PATENT DOCUMENTS

| | | |
|---|---|---|
| CN | 102651748 A | 8/2012 |
| CN | 103312730 A | 9/2013 |
| CN | 103369031 A | 10/2013 |
| CN | 104038534 A | 9/2014 |
| CN | 104077312 A | 10/2014 |
| CN | 104361122 A | 2/2015 |
| CN | 104866500 A | 8/2015 |
| CN | 105022802 A | 11/2015 |
| CN | 105320514 A | 2/2016 |
| CN | 105528450 A | 4/2016 |
| CN | 106161628 A | 11/2016 |
| WO | WO 2016023336 A1 | 2/2016 |

OTHER PUBLICATIONS

Tencent Technology, IPRP, PCT/CN2017/087910, Jan. 15, 2019, 6 pgs.

* cited by examiner

METHOD AND APPARATUS FOR UPLOADING PHOTOGRAPHED FILE

PRIORITY CLAIMS AND RELATED APPLICATION

This application is a continuation-in-part of PCT application number PCT/CN2017/087910, entitled "METHOD AND APPARATUS FOR UPLOADING PHOTOGRAPHED FILE", filed on Jun. 12, 2017, which claims priority to Chinese Patent Application No. 201610549916.1, entitled "METHOD AND APPARATUS FOR UPLOADING PHOTOGRAPHED FILE" filed with the Chinese Patent Office on Jul. 13, 2016, all of which are incorporated by reference in their entirety.

FIELD OF THE TECHNOLOGY

Embodiments of the present disclosure relate to the field of information processing technologies, and in particular, to a method and an apparatus for uploading a photographed file.

BACKGROUND OF THE DISCLOSURE

With the development of mobile terminals, a user may upload images and audio and videos, write logs, and the like in a personal network space by using a mobile terminal. The personal network space is a social platform for displaying personal information, such as an instant messaging application program, a microblog, a blog, Facebook, or social networking services (SNS).

In the related technology, a method for uploading a photographed file includes: starting an image scanning component after logging in to a personal network space; scanning, by using the image scanning component, whether photographed files, a time interval between whose generation time and current time is less than a preset duration exist in a mobile terminal; if yes, displaying a photographed file uploading bar, where the photographed file uploading bar displays the photographed files, a time interval between whose generation time and the current time is less than the preset duration; receiving a trigger signal on the photographed file uploading bar; entering a selection interface according to the trigger signal; selecting, from the photographed files according to a received selection signal, a photographed file needing to be uploaded; and after receiving an uploading instruction, entering an uploading interface and uploading the photographed file selected by a user. The photographed files may be photos or videos.

In the conventional photo uploading scenario described above, the user has to drive the photo uploading process, and have to go to the photo library to select the photos to be uploaded by looking at many photos in the photo library. This can be time consuming and tedious for the user, as there may be thousands of photos saved in the photo library. Even if the photo library categorizes the photos by the timestamps of the photos, the user would still have to leave the social network user interface to go into the photo selection interface of the photo library, losing the context of the social network user interface. In some social networking interface, a group of newly taken photos is displayed on the photographed file uploading bar as a prompt for the user to upload those photos to the social network as status updates for the user. However, the user would still have to go to the photo selection interface by clicking on the photographed filed uploading bar. Therefore, after entering the selection interface, the user needs to select, from the photographed files by means of a plurality of clicking operations, a photographed file needing to be uploaded into the personal network space. The entire operation process is relatively complex, and the efficiency of human computer interaction is relatively low. Consequently, the user may possibly reduce the number of times of uploading because the operation of uploading a photographed file is complex, leading to a relatively low probability of uploading a photographed file.

SUMMARY

To resolve the problems in the related technology that the operation process is relatively complex and the efficiency of human computer interaction is relatively low, embodiments of the present disclosure provide a method and an apparatus for uploading a photographed file. The disclosed method provides innovations in multiple aspects in the process of recommending photos to upload to the social network, and selection and categorization of the photos such that it is easy and more efficient for the user to access the photos that he/she is more likely to use for publishing in the social network. For example, by correctly identifying the photos that the user is more likely to upload by the location, time, and other characteristics in the photo library (e.g., with the correct time granularities, and location granularities), and presenting the recommendations in an appropriate form and at an appropriate time (e.g., the size of the recommendations, and the timing of the recommendations, and location of the recommendations in the user interface, the connection state of the user device, etc.), the user is more likely to take the recommendations and upload the recommended photos. Furthermore, allowing the user to easily modify the recommendations and upload the photos without leaving the social networking user interface helps to maintain the continuity of the user's operation, reducing the operation time and efficiency of the user interface. The technical solutions are as follows:

In a first aspect, a method for uploading a photographed file to a social network platform, is performed at a device having one or more processors and memory. The device displays a user interface of the social network platform. The user interface includes status updates of a plurality of users associated with a user account corresponding to the device, and the user interface includes a photographed file uploading region and an input region for entering status updates of the user account. The device presents one or more recommended photographed files for upload in the photographed file uploading region in the user interface of the social network platform. The one or more recommended photographed files are selected from a photo library on the device through a plurality of operations performed by the device prior to a time that the user interface is displayed at the device.

In some embodiments, the device divides photographed files generated in a first time period into one or more groups based on their photographing location and photographing time information. When the photographing location of a first respective photographed file is not a regular location associated with a user of the device, the device groups the first respective photographed file with one or more other first photographed files in accordance a common photographing location shared by the first respective photographed file and the one or more other first photographed files.

But when a photographing location of a second respective photographed file is a regular location associated with the user of the device, the device groups the second respective photographed file with one or more other second photographed files in accordance with a common photographing time shared by the second respective photographed file and the one or more other second photographed files. The device then selects at least one photographed file from the one or more groups as a recommended photographed file to include in the photographed file uploading region in the user interface.

According to a second aspect of the present disclosure, a computing device includes one or more processors, memory, a display, a touch-sensitive surface, and a plurality of instructions stored in the memory that, when executed by the one or more processors, cause the computing device to perform the aforementioned method.

According to a third aspect of the present disclosure, a non-transitory computer readable storage medium storing a plurality of instructions configured for execution by a computing device having one or more processors, the plurality of instructions causing the computing device to perform the aforementioned method.

Details of one or more embodiments of the present disclosure are provided in the following accompanying drawings and descriptions. Other features, objectives, and advantages of the present disclosure become clear in the specification, the accompanying drawings, and the claims.

The technical solutions provided in the embodiments of the present disclosure further have the following beneficial effects:

Attribute information of several photographed files generated in a first time period is obtained, the attribute information including photographing time and a photographing location; the photographed files are divided into at least one group according to the attribute information, each group corresponding to one photographing event; and the photographed file corresponding to the photographing event is determined as a to-be-uploaded photographed file, so that the problem in the related technology that the operation process of uploading a photographed file is relatively complex, and the efficiency of human computer interaction is relatively low is resolved. Photographed files are grouped, and a photographed file included in a photographing event corresponding to each group is determined as a to-be-uploaded photographed file, so as to simplify the operation process of uploading the photographed file and reduce selection operations for selecting the photographed file by a user, thereby improving the efficiency of uploading the photographed file by the user.

BRIEF DESCRIPTION OF THE DRAWINGS

To describe the technical solutions of the embodiments of the present disclosure more clearly, the following briefly introduces the accompanying drawings required for describing the embodiments. Apparently, the accompanying drawings in the following description show merely some embodiments of the present disclosure, and a person of ordinary skill in the technology may still derive other drawings from these accompanying drawings without creative efforts.

DESCRIPTION OF EMBODIMENTS

To make the objectives, technical solutions, and advantages of the present disclosure clearer, the following further describes implementations of the present disclosure in detail with reference to the accompanying drawings.

Figure 1:
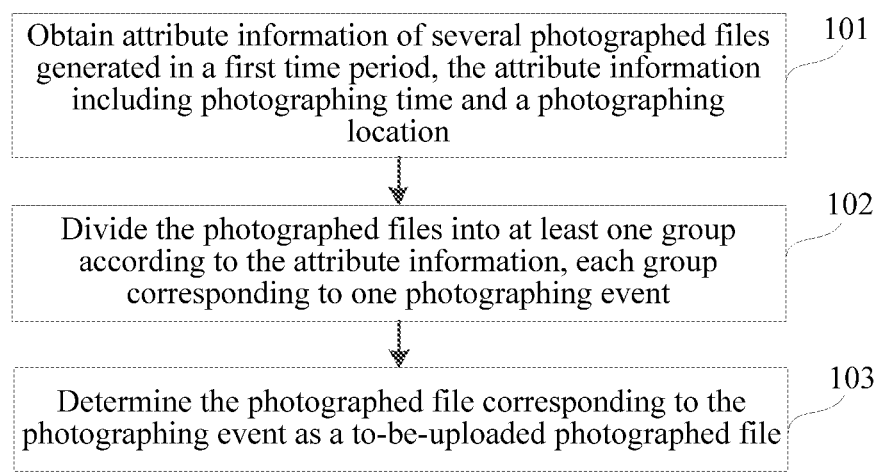
FIG. 1 is a flowchart of a method for uploading a photographed file according to an embodiment of the present disclosure.

Referring to FIG. 1, FIG. 1 is a flowchart of a method for uploading a photographed file according to an embodiment of the present disclosure. This embodiment is exemplified by using that the method for uploading a photographed file is applied to a mobile terminal as an example. The method includes:

Step 101: Obtain attribute information of several photographed files generated in a first time period, the attribute information including photographing time and a photographing location.

In some embodiments, the first time period is a time period between historical time and current time, and a time length of the first time period is a preset length. For example, the first time period is 3 days, 5 days, 1 week, or the like.

Step 102: Divide the photographed files into at least one group according to the attribute information, each group corresponding to one photographing event.

The photographing event is an event determined based on the photographing location and the photographing time, and is used for classifying several photographed files into one set. In some embodiments, each photographing event corresponds to one photographing location, and each photographing event further corresponds to one photographing time period. When there is a plurality of photographing events, there are at least two photographing events corresponding to different photographing locations, and there are at least two photographing events corresponding to different photographing time periods.

Step 103: Determine the photographed file corresponding to the photographing event as a to-be-uploaded photographed file.

Based on the above, according to the method for uploading a photographed file provided in this embodiment, photographed files are grouped, and a photographed file corresponding to a photographing event corresponding to a group is determined as a to-be-uploaded photographed file, so as to resolve the problem in the related technology that the operation process of uploading a photographed file is relatively complex, and the efficiency of human computer interaction is relatively low, and simplify the operation process of uploading the photographed file, thereby improving the efficiency of uploading the photographed file by a user.

In some embodiments, when grouping the photographs and identifying photographing events represented in the photo library, the device first identifies a suitable time period for grouping the photographs for identifying the photographing events. For example, people often take a lot of photographs during a short period of time at a photographing event, such as a party, an outing, a trip etc. Taking a trip as an example. The user may take some photos at home to record the state of the house before he heads out to the airport (e.g., 5 photos at 8:00 am). The user may take a photo at the airport of his ticket for checking in (e.g., 1 photo at 9:30 am). The user may arrive at a resort hotel and take a photo of the hotel room (e.g., 1 photo at 5:00 pm). The user may then go to a party at the resort and take many photos at the party. For example, the user may take many photographs at the beginning of a party when greeting guests and meeting new people (e.g., 20 photos from 7:00 pm-7:30 pm), and the user may take many photographs at the end of the party when saying goodbyes (e.g., 30 photos from 9:30 pm-10 pm), the user may also take photos during the party (e.g., 10 photos from 7:30 pm-9:30 pm). The location granularity used to separate the different photographing events that occurred during the day may be at a city level, since that would result in two separate groups, as opposed to four groups. The time granularity used to separate the different photographing events that occurred during the day may be half a day, since that would result in two separate groups, as opposed to six groups. In some embodiments, after the photos are clustered based on time, and location separately. The time granularity is varied to obtain the best grouping based on time. For example, the time granularity is changed by hour, and the increase of time granularity that results in the biggest reduction in the number of resulting groups is chosen as the most appropriate time granularity. Similarly, the location granularity is changed by distance, and the increase of location granularity that results in the biggest reduction in the number of resulting groups is chosen as the most appropriate location granularity. In the above example, the reduction of location-based groups from four to two only occurs when the location granularity is increased from local distances to city-level distances, so the location granularity is city-level distances. In addition, the reduction of time-based groups from four to two occurs when the time granularity is increased from 1.5 hour to 2.5 hour, so the time granularity is 2.5 hours. Therefore, based on the chosen time and location granularity, two photographing events are identified, one including the photos taken at home, airport, and hotel, and the other taken at the party. When recommending photos for uploading, the photos in the first category is filtered by irregular location (e.g., non-home location, non-work location, and other locations that are not frequently visited by the user), and the photo taken at the airport and the hotel are selected for recommendation while the photo taken at home are not recommended. For the second group, the photos are filtered based on clusters formed by time during the party, and a small number of representative photos are selected from the beginning of the part and end of party, and more photos are selected from the middle of the party. For example, when there are a large number of photos taken in a short period of time, there is a higher likelihood that, the photos are duplicative and only a smaller faction are important or of interest. In contrast, if the photos are taken during a period of time, but with an increased and irregular interval, the photos are more likely taken at significant moments (e.g., during the party), and should be selected and recommended.

Figure 2:
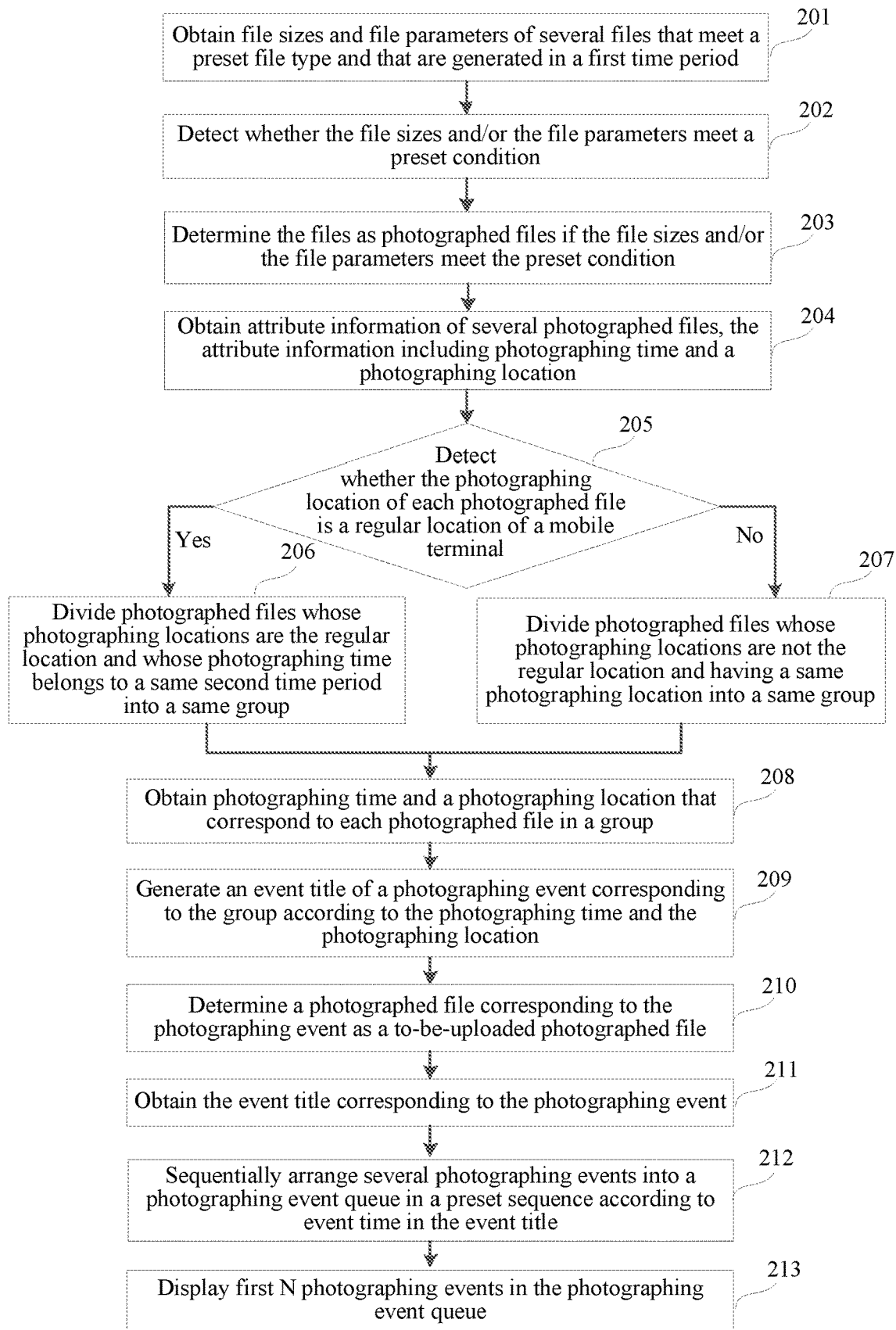
FIG. 2 is a flowchart of a method for uploading a photographed file according to another embodiment of the present disclosure.

Referring to FIG. 2, a method flowchart of a method for uploading a photographed file according to another embodiment of the present disclosure is shown in FIG. 2. This embodiment is exemplified by using that the method for uploading a photographed file is applied to a mobile terminal as an example. The method includes:

Step 201: Obtain file sizes and file parameters of several files that meet a preset file type and that are generated in a first time period.

In some embodiments, the preset file type includes: at least one of an image type, a video type, or an audio type. The file parameter includes information such as a field of photographing time, a field of a photographing location, and color coding. For example, when a captured photo is in an exif format, the captured photo carries information such as a field of photographing time and a photographing condition. The first time period may be 3 days, 5 days, 7 days, or the like.

In some embodiments, before obtaining the file sizes and the file parameters of the several files that meet the preset file type, the mobile terminal first detects whether a time interval between current time and time when the file sizes and the file parameters of the several files that meet the preset file type are obtained last time meets a third preset time interval. When the time interval meets the third preset time interval, the mobile terminal obtains the file sizes and the file parameters of the several files that meet the preset file type and that are generated in the first time period before the current time. In some embodiments, the third preset time interval is equal to the duration of the first time period.

In a specific example, assuming that the third preset time interval and the first time period are 7 days, after obtaining current time, the mobile terminal detects whether a time interval between the current time and time when file sizes and file parameters of image files in the mobile terminal are obtained last time reaches 7 days, and if yes, the mobile terminal obtains the file sizes and the file parameters of the image files generated within 7 days before the current time.

In some embodiments, each time the mobile terminal is switched on, the mobile terminal performs the foregoing step of detecting whether the time interval between the current time and time when obtaining is performed last time meets the third preset time interval; and/or, when a target application program is started, the mobile terminal performs the foregoing step of detecting whether the time interval between the current time and time when obtaining is performed last time meets the third preset time interval; and/or, at preset time intervals, the mobile terminal performs the foregoing step of detecting whether the time interval between the current time and time when obtaining is performed last time meets the third preset time interval. The target application program may be any one of an instant messaging program, a social application program, or a blog type application program.

Step 202: Detect whether the file sizes and/or the file parameters meet a preset condition.

The preset condition includes that the file size is greater than a preset size, and/or a field of the photographing time exists in the file parameter. In some embodiments, the file parameter is a file name.

A file photographed by using the mobile terminal has a size of a particular rule. For example, the size of a photo captured by using a mobile terminal having an Android system is usually greater than 300 KB, and the size of a photo captured by using a mobile terminal having an IOS system is usually greater than 500 KB. A file parameter of the file photographed by using the mobile terminal usually includes a field of the photographing time.

Therefore, the mobile terminal detects whether the file size meets the preset condition, the preset condition including that the file size is greater than the preset size; or the mobile terminal detects whether the file size meets the preset condition, the preset condition including that a field of the photographing time exists in the file parameter; or the mobile terminal detects whether the file size and the file parameter meet the preset condition, the preset condition including that the file size is greater than the preset size and a field of the photographing time exists in the file parameter.

When the preset condition includes that the file size is greater than the preset size and a field of the photographing time exists in the file parameter, detection may be implemented in any one of the following two implementations.

In a possible implementation, after obtaining the file sizes and the file parameters, the mobile terminal first compares the file size of each file with the preset size, and determines candidate files whose file sizes are greater than the preset size, and then detects whether a field of the photographing time exists in the file parameter of each file in the candidate files. The "candidate files" may also be referred to as "determined files".

In another possible implementation, after obtaining the file sizes and the file parameters, the mobile terminal first detects whether a field of the photographing time exists in the file parameter of each file, and determines candidate files whose file parameters have the field of the photographing time, and then compares the file size of each file in the candidate files with the preset size.

Step 203: Determine the files as photographed files if the file sizes and/or the file parameters meet the preset condition.

If the mobile terminal detects whether the file size meets the preset condition, when detecting that the file size is greater than the preset size, the mobile terminal determines the file as a photographed file.

If the mobile terminal detects whether the file parameter meets the preset condition, when detecting that a field of the photographing time exists in the file parameter, the mobile terminal determines the file as a photographed file.

If the mobile terminal detects whether the file size and the file parameter meet the preset condition, when detecting that the file size is greater than the preset size and a field of the photographing time exists in the file parameter, the mobile terminal determines the file as a photographed file.

Identifying the photographed files in the photo library helps to filter out photos in the photo library that are saved to the photo library through downloading from webpages or file transfer means (e.g., from instant messaging or other people's feed). It is less likely that the user will choose to upload a saved photo onto a social network as a status update that is not captured by the user himself on the user device.

In some embodiments, the photographed file is a file obtained by photographing (or recording) by using the mobile terminal. The photographed file includes at least one of an image, audio, and or a video.

In a specific example, the mobile terminal determines an image whose obtained image size is greater than 500 KB and whose image parameter has a field of the photographing time as an image captured by using the mobile terminal.

It should be noted that if the file size is less than or equal to the preset size, or a field of the photographing time does not exist in the file parameter, the file is determined as a non-photographed file, and the following steps are not performed on the file.

Step 204: Obtain attribute information of several photographed files, the attribute information including photographing time and a photographing location.

After determining the photographed files, the mobile terminal obtains the attribute information of the determined several photographed files.

In a specific example, assuming that a user captures a plurality of photos of Tian'anmen Square of Beijing by using a smartphone when the user is on a business trip in Beijing, the mobile terminal obtains attribute information of the plurality of photos. The attribute information includes: photographing time: July 1; and a photographing location: Tian'anmen Square of Beijing.

In some embodiments, when the photographing time includes multilevel time units such as year, month, day, hour, minute, and second, information of some of time units therein may be omitted. For example, "minute" and "second" are omitted.

Step 205: Detect whether the photographing location of each photographed file is a regular location of a mobile terminal.

After obtaining the attribute information of the several photographed files, the mobile terminal compares the photographing location of each photographed file with the regular location of the mobile terminal, and detects whether the photographing location is the regular location of the mobile terminal.

In some embodiments, the regular location of the mobile terminal may be obtained by collecting statistics on a historical point of interest (POI) during login of instant messaging software, for example, a POI during login of an instant messaging program, a POI during login of a microblog, and a POI during login of a blog. In some embodiments, the regular location of the mobile terminal is manually set by a user in advance.

If a detection result is that the photographing location of the photographed file is the regular location, step 206 is performed; and if the detection result is that the photographing location of the photographed file is not the regular location, step 207 is performed.

Step 206: If the photographing location is the regular location, divide photographed files whose photographing locations are the regular location and whose photographing time belongs to a same second time period into a same group. The time period is set in accordance with the time granularity that is selected based on which one of multiple preset time granularities produces the biggest reduction of the resulting number of groups when changed from the adjacent preset time granularity.

If the mobile terminal detects that the photographing location of the photographed file is the regular location, it indicates that the photographed file is generated at the regular location of the mobile terminal. The regular location is a location where the user works or lives for a long time, has a relatively fixed scenario, and has a relatively low probability of generating an interesting or topical photographed file. Therefore, a second time period is set for the photographed file, and the photographed files whose photographing locations are the regular location and whose photographing time belongs to a same second time period are divided into a same group.

Figure 3:
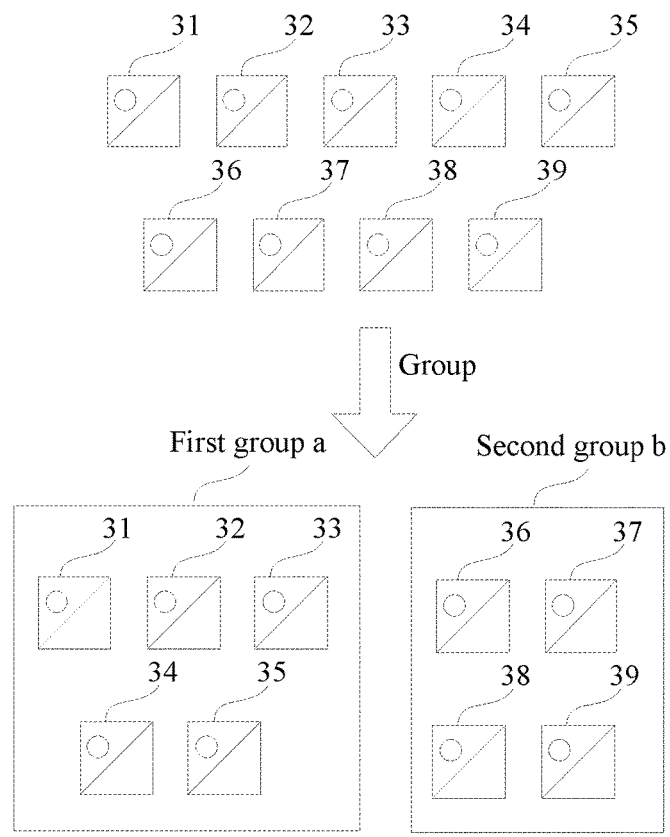
FIG. 3 is a schematic diagram of grouping photographed files according to an embodiment of the present disclosure.

In a specific example, as shown in FIG. 3, based on the foregoing example, the mobile terminal obtains several image files 31 to 39 within 7 days before the current time. Assuming that the second time period is 1 day, and the regular location of the mobile terminal is Shenzhen, several image files whose photographing locations are Shenzhen within 7 days are divided in a unit of 1 day. Image files 31 to 35 whose photographing locations are Shenzhen within the first day before the current time are divided into a first group a. Image files 36 to 39 whose photographing locations are Shenzhen within the second day before the current time are divided into a second group b. By such analogy, the image files whose photographing locations are Shenzhen within 7 days are divided into 7 groups in a unit of 1 day.

In some embodiments, the start time and the duration of the second time period may be preset. Preferably, the start time of the second time period is set to 4:00 a.m., and the duration is set to 1 day. The start time is set to 4:00 a.m., so that scenarios of night social parties can be covered.

In some embodiments, the second time period is less than the first time period. For example, the first time period is 7 days, and the second time period is 1 day.

Step 207: If the photographing location is not the regular location, divide photographed files whose photographing locations are not the regular location and having a same photographing location into a same group.

If the mobile terminal detects that the photographing location of the photographed file is not the regular location, it indicates that the photographed file generated by the mobile terminal in the first time period is not generated at the regular location of the mobile terminal, and may be generated when the user is on a business trip or on a travel. When the photographing location is not the regular location, the probability of generating an interesting or topical photographed file is relatively high. Therefore, the photographed files whose photographing locations are not the regular location and having a same photographing location are divided into a same group.

In a specific example, based on the foregoing example, the mobile terminal obtains several image files within 7 days before the current time, and the regular location of the mobile terminal is Shenzhen. Several image files whose photographing locations are Beijing within 7 days are divided into a third group. Several image files whose photographing locations are Guangzhou are divided into a fourth group. By such analogy, image files whose photographing locations are not the regular location within 7 days are divided into several groups according to the photographing locations.

Step 208: Obtain photographing time and a photographing location that correspond to each photographed file in a group.

After determining several groups, the mobile terminal obtains the photographing time and the photographing location that correspond to each photographed file in each group.

For example, the photographing time corresponding to each photographed file in the third group is July 1, and the photographing location is Beijing.

Step 209: Generate an event title of a photographing event corresponding to the group according to the photographing time and the photographing location.

The event title includes: an event location and event time. The event time is the photographing time or holiday information corresponding to the photographing time.

The mobile terminal generates the event title of the photographing event corresponding to the group according to the photographing time and the photographing location corresponding to each photographed file in each group.

For example, in the foregoing example, the generated event title of the photographing event corresponding to the third group is: Beijing ● CPC Founding Day.

Step 210: Determine a photographed file corresponding to the photographing event as a to-be-uploaded photographed file.

After obtaining the photographing event corresponding to each group, the mobile terminal determines the photographed file corresponding to the photographing event as the to-be-uploaded photographed file.

In some embodiments, after obtaining the photographing event corresponding to each group, the mobile terminal determines the photographing event as a to-be-uploaded photographing event, which correspondingly has a photographed file and an event title.

Step 211: Obtain the event title corresponding to the photographing event.

After the mobile terminal determines the photographed file corresponding to the photographing event as the to-be-uploaded photographed file, the photographing event is also determined as the to-be-uploaded photographing event. The mobile terminal obtains the event title corresponding to the photographing event determined as the to-be-uploaded photographing event.

In some embodiments, if several to-be-uploaded photographing events exist in the mobile terminal, the mobile terminal obtains the event title of each to-be-uploaded photographing event.

Step 212: Sequentially arrange several photographing events into a photographing event queue in a preset sequence according to event time in the event title.

In some embodiments, the preset sequence is a reverse time sequence.

After obtaining event titles corresponding to the several to-be-uploaded photographing events, the mobile terminal sequentially arranges the several photographing events in a reverse time sequence according to the event time in the obtained event titles, so as to form the photographing event queue.

Figure 4:
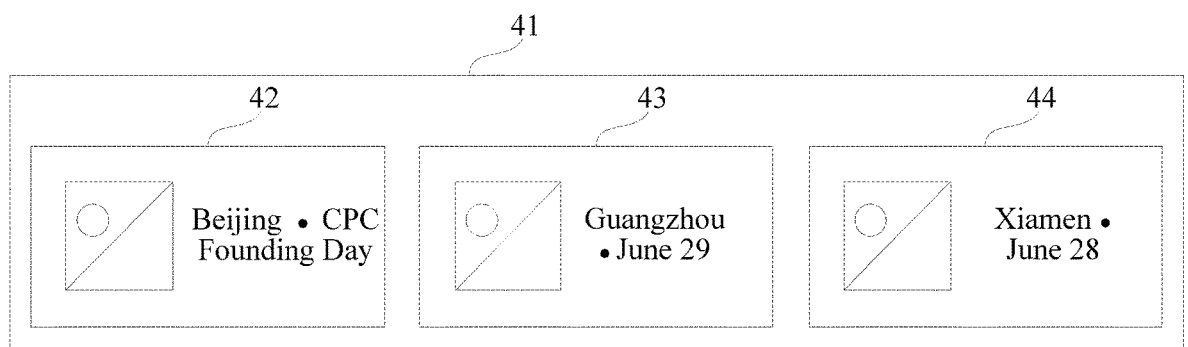
FIG. 4 is a schematic diagram of a photographing event queue according to an embodiment of the present disclosure.

For example, when 3 to-be-uploaded photographing events exist in the mobile terminal, the mobile terminal uses a to-be-uploaded photographing event, a time interval between which and the current time is shortest as a first to-be-uploaded photographing event, and uses a photographing event, a time interval between which and the current time is longest as a third to-be-uploaded photographing event. As shown in FIG. 4, an event title corresponding to the first to-be-uploaded photographing event 42 in the photographing event queue 41 is Beijing ● CPC Founding Day; an event title corresponding to the second to-be-uploaded photographing event 43 is Guangzhou ● June 29; and an event title corresponding to the third to-be-uploaded photographing event 44 is Xiamen ● June 28.

Step 213: Display first N photographing events in the photographing event queue, where N is a positive integer.

After forming the photographing event queue, the mobile terminal displays the first N photographing events in the photographing event queue into the mobile terminal.

Figure 5:
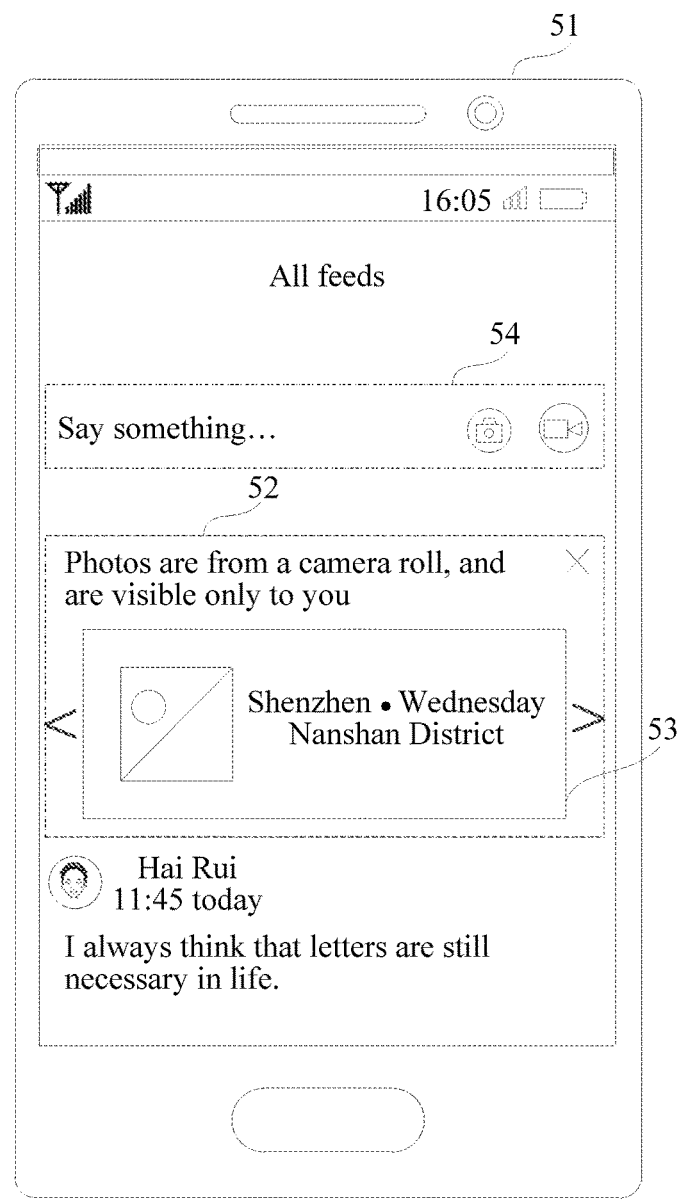
FIG. 5 is a schematic diagram of an interface displaying a photographing event according to an embodiment of the present disclosure.

In a specific example, as shown in FIG. 5, a user views all feeds (e.g., status updates) of friends of the user by using instant messaging software installed in a smartphone 51. A display interface of all feeds displays a photographed file uploading bar 52. First N photographing events in a photographing event queue are displayed on the photographed file uploading bar 52. The user views the first N photographing events in a switching manner by means of left and right sliding. An event title corresponding to a photographing event 53 ranked on top is Shenzhen ● Wednesday Nanshan District. A feed "I always think that letters are still necessary in life" issued by a friend Hai Rui is displayed below the photographed file uploading bar 52. A status update input region 54 is further included in the interface of all feeds. The status update input region 54 includes "say something" for recommending the user to issue a feed.

Preferably, N is 3.

In some embodiments, photographed files corresponding to the N photographing events displayed in the mobile terminal are displayed in a slideshow manner. The time sequence of a slideshow is one-to-one corresponding to photographing time of the photographed files.

Based on the above, according to the method for uploading a photographed file provided in this embodiment, photographed files are grouped, and a photographed file corresponding to a photographing event corresponding to a group is determined as a to-be-uploaded photographed file, so as to resolve the problem in the related technology that the operation process of uploading a photographed file is relatively complex, and the efficiency of human computer interaction is relatively low, and simplify the operation process of uploading the photographed file, thereby improving the efficiency of uploading the photographed file by a user.

In addition, photographed files whose photographing locations are not the regular location and having a same photographing location are divided into a same group, so as to improve the efficiency of sorting out photographed files by the user, thereby facilitating uploading the sorted out photographed files by the user, and simplifying the operation process of uploading the photographed files.

In addition, corresponding event titles are generated for different photographing events, so as to help the user recover memories of the corresponding photographed files in the photographing events, thereby facilitating improving the probability of uploading photographed files by the user.

It should be supplemented that in an optional embodiment, after receiving a triggered signal on a displayed photographing event, the mobile terminal jumps to a photographed file uploading interface and directly uploads a photographed file corresponding to the photographing event, and does not need to jump to a selection interface to receive a selection signal of selecting a photographed file by the user, thereby simplifying the operation process of uploading a photographed file by the user. In another optional embodiment, after receiving a triggered signal on a displayed photographing event, the mobile terminal jumps to a preview interface of a photographed file corresponding to the photographing event. In the preview interface, the mobile terminal may select a to-be-uploaded photographed file, and uploads the selected photographed file after receiving an uploading confirming signal.

It should also be supplemented that in the embodiment shown in FIG. 2, step 201 to step 203, step 208 to step 209, and step 211 to step 213 are optionally performed steps. This embodiment makes no specific limitation thereto. For example, step 201 to step 203 may be replaced with: A mobile terminal obtains, from a preset path corresponding to a camera application program, photographed files photographed in a first time period.

Based on the embodiment shown in FIG. 2, in step 210, the photographed file corresponding to each photographing event is determined as the to-be-uploaded photographed file. However, in actual application, not all photographed files corresponding to photographing events need to be determined as the to-be-uploaded photographed files. The photographed files corresponding to the photographing events need to be detected, and then photographed files corresponding to photographing events that meet a condition are determined as the to-be-uploaded photographed files. Therefore, determining the photographed file corresponding to the photographing event as the to-be-uploaded photographed file may be implemented in any one of the following three possible implementations. In some embodiments, when a recommended photo is presented in the uploading bar, the user may touch one of the recommended photo to see a pop-up window that includes multiple other photos in the same event that are determined to be similar to the recommended photo (e.g., including the same people based on face detection, or have the same scene composition as the recommended photo) and that are not included as a recommended photo. The user can slide select one of the photos in the pop-up window to switch out the recommended photo to the selected photo (e.g., by a tap input on a desired photo in the pop-up window) or can add one of the photos to the recommended photos (e.g., by dragging the photo from the pop-up window to the uploading bar). This allows the user to quickly edit the recommendations and upload the photos without leaving the current context, reducing time and reducing operation errors for the uploading operation to the social network platform.

In a first possible implementation, after obtaining the photographing event corresponding to each group, the mobile terminal detects whether the number of photographed files corresponding to the photographing event is greater than a first threshold; and if yes, the mobile terminal determines the photographed files corresponding to the photographing event as the to-be-uploaded photographed files.

Preferably, the first threshold is 5. When the number of the photographed files corresponding to the photographing event is greater than 5, it indicates that the photographing event has a qualification of being determined as a to-be-uploaded photographing event. The photographed files corresponding to the photographing event are determined as the to-be-uploaded photographed files.

In a second possible implementation, after obtaining the photographing event corresponding to each group, the mobile terminal detects whether the number of unexposed photographed files corresponding to the photographing event is greater than a second threshold; and if yes, the mobile terminal determines the photographed files corresponding to the photographing event as the to-be-uploaded photographed files.

In some embodiments, the unexposed photographed files include at least one of: photographed files that have not been displayed on the mobile terminal, photographed files that have not been viewed, or photographed files that have not been determined as the to-be-uploaded photographed files in a historical time period. The photographed files that have not been displayed on the mobile terminal include but are not limited to: videos that are saved by default after being taken by a user, and other images than the last image in a plurality of images quickly and continuously captured by the user. The photographed files that have not been viewed include but are not limited to: files whose corresponding thumbnails are displayed in an album application program but are not clicked in the album application program by the user for view in a full-screen manner.

In a third possible implementation, after obtaining the photographing event corresponding to each group, the mobile terminal detects whether the number of non-uploaded photographed files corresponding to the photographing event is greater than a third threshold; and if yes, the mobile terminal determines the photographed files corresponding to the photographing event as the to-be-uploaded photographed files.

It should be noted that the three possible implementations may be synchronously used as a determining condition of determining the photographed file corresponding to the photographing event as the to-be-uploaded photographed file, or any one of them or a combination of any two of them is used as a determining condition of determining the photographed file corresponding to the photographing event as the to-be-uploaded photographed file. This embodiment makes no specific limitation to a combination manner of the three possible implementations.

In a specific example, Xiaoming captures several photos in Beijing within 3 days before current time by using a smartphone. When detecting that a time interval between the current time and time when photos are obtained last time is greater than 3 days, the smartphone detects whether grouping information of the photos captured within 3 days before the current time is stored in the smartphone. If the grouping information of the photos captured within 3 days before the current time does not exist, attribute information of the captured photos that is generated by the smartphone within 3 days before the current time is obtained. The several photos are grouped according to photographing locations and photographing events of the groups. Each group corresponds to one photographing event. Whether the number of photos included in each group is greater than 5 is detected. If the number of the photos included in each group is greater than 5, it is determined that a photographing event corresponding to the group has a qualification of being determined as a to-be-uploaded event. For each determined group, whether the number of unexposed photos included in the group is greater than 3 is detected. If the number of the unexposed photos included in the group is less than or equal to 3, the group is discarded. If the number of the unexposed photos included in the group is greater than 3, detection of whether the number of non-uploaded photos included in the group is greater than 3 is continued. If the number of the non-uploaded photos included in the group is less than or equal to 3, the group is discarded. If the number of the non-uploaded photos included in the group is greater than 3, the photographing event corresponding to the group is added to an event queue. Photographing events determined as to-be-uploaded photographing events are arranged in the event queue in a sequence of event time. Finally, whether the smartphone completes detecting all groups within 3 days before the current time is detected. If the smartphone completes detecting all groups within 3 days before the current time, first 3 photographing events in the event queue are displayed in the smartphone.

In the optional embodiment shown in FIG. 2, step 213 of displaying first N photographing events in the photographing event queue on the mobile terminal may be implemented in the following manner:

detecting, by the mobile terminal, whether a wireless network connection exists in the mobile terminal;

if a wireless network connection exists in the mobile terminal, displaying the first N photographing events in the photographing event queue on the mobile terminal; and if a wireless network connection does not exist in the mobile terminal, displaying a photographing event formed in a fourth time period to which current time belongs, where the number of photographed files corresponding to the photographing event is less than a preset number. For example, the fourth time period is a time period in a unit of a day. When a wireless network connection does not exist in the mobile terminal, a photographing event formed on that day is displayed on the mobile terminal, and the number of photographed files corresponding to the photographing event formed on that day is less than 30.

It should be supplemented that after a user switches off an area displaying a photographing event in the mobile terminal, during next entry, the area of the photographing event is not displayed in the mobile terminal any more. For example, after the user switches off an area displaying a photographing event in an interface of all feeds, when the user enters the interface of all feeds again within 24 hours, the mobile terminal does not display the area of the photographing event any more. If the area is continuously switched off twice within 48 hours, when the user enters the interface of all feeds again within 168 hours, the mobile terminal does not display the area of the photographing event any more.

In some embodiments, depending on the current available network connection type, the device may increase or reduce the number of recommended photos shown in the uploading area. For example, if the device detects that the current network connection is WiFi or other broadband connection, the device provides 6 recommended photos for each event, and a total of less than 30 photos; and if the device detects that the current network connection is a paid connection or cellular network connection with bandwidth restrictions, the device provides 1 recommended phot for each event, and a total of 3 photos. In some embodiments, the user can override the restriction by selecting one of the recommended photos to see other recommended photos that are not displayed due to the bandwidth restriction detected by the device. For example, if the user hover over the photo shown for a first event, the user will see the other 5 photos that are recommended for the same event expanded out from the single photo in the uploading bar, if the user hover over one of the 6 photos now shown in the uploading bar, the user will be shown a pop-up window a number of similar photos in the same event. In this manner, the user has more control over how many photos to see as recommendations, and have easy access to other photos that he/she may wish to upload in the social network user interface; but otherwise, the user does not have to deal with photos that he/she does not wish to upload, e.g., due to low interest level, or low upload bandwidth, thus reducing operating time and increase operation efficiency when uploading photos for status update in social network applications.

Based on the disclosure set forth above, in some embodiments, a method for uploading a photographed file to a social network platform is performed at a device (e.g., a mobile device associated with a user account of the social network platform and includes a local photo library for storing photos captured by the device using the device's cameras) having one or more processors and memory. The device displays a user interface of the social network platform, the user interface (e.g., user interface shown in FIG. 5) includes status updates of a plurality of users associated with a user account corresponding to the device (e.g., status updates of a user and the user's social network contacts on the social network platform, such as continues status updates, posts, and photos posted by the user and the user's friends on the social network), and the user interface includes a photographed file uploading region (e.g., region 53 in FIG. 5) and an input region (e.g., region 54 in FIG. 5) for entering status updates of the user account. The device presents one or more recommended photographed files for upload in the photographed file uploading region (e.g., region 53) in the user interface of the social network platform. The one or more recommended photographed files are selected from a photo library on the device through a plurality of operations performed by the device prior to a time that the user interface is displayed at the device (e.g., when the social network application corresponding to the user interface is launched at the device or redisplayed on the device after the user switched back to the social network application from other applications). Specifically, the device divides a plurality of photographed files generated in a first time period (e.g., a day or a week) into one or more groups based on photographing location and photographing time (e.g., clustering the photographs taken during the past 24 hours or past week based on photograph time and photograph location, respectively, without imposing hard limits on number of clusters, or cluster size; then vary the time and/or location granularity to reduce the total number of clusters, where the time and/or location granularity that produces the largest reduction in cluster number is chosen as the time and/or location granularity that is used to divide the plurality of photographed files into the one or more groups). The device, when dividing the photographed files, in accordance with a determination that a photographing location of a first respective photographed file is not a regular location associated with a user of the device, groups the first respective photographed file with one or more other first photographed files in accordance a common photographing location (e.g., a common photographing location refers to one or more photographing locations that fall into the same group based on a currently selected location granularity) of the first respective photographed file and the one or more other first photographed files, and in accordance with a determination that a photographing location of a second respect photographed file is a regular location associated with the user of the device, groups the second respective photographed file with one or more other second photographed files in accordance with a common photographing time (e.g., a common photographing time refers to one or more photographing times that fall into the same group based on a currently selected time granularity) of the second respective photographed file and the one or more other second photographed files. The device selects at least one photographed file from at least one of the one or more groups as a recommended photographed file to include in the photographed file uploading region in the user interface (e.g., not all newly taken photos in the preset time period are presented as recommended photos).

In some embodiments, the device generates a respective event name for each of the one or more groups based on the common photographing location or the common photographing time associated with the group; and the device displays the respective event name for each of the one or more groups in the photographed file uploading region in the user interface.

In some embodiments, selecting at least one photographed file from at least one of the one or more groups include: for a first group of the photographed files that are grouped based on a common photographing location, selecting a recommended photographed file without consideration of the photographing time; and for a second group of the photographed files that are grouped based on a common photographing time, selecting a recommended photographed file only if the second group of photographed files meet preset recommendation criteria that includes a requirement on the photographing time of the second group of photographed files (e.g., for example, the preset recommendation criteria require that the common photograph time is one of a special holiday, or a special time of the day (e.g., at night, after work time, on the weekend, etc.), or the preset recommendation criteria require that the respective photograph time of the second group of photographed files are less than a threshold amount of time apart from one another (e.g., they are taken in a short duration as a cluster of photos (e.g., in a burst mode, or in a continuous photo taking action of the user))).

In some embodiments, the device presents the photographed file uploading region (e.g., region 53 in FIG. 5) concurrently with the input region (e.g., region 54 in FIG. 5) for entering status updates of the user account in the user interface in accordance with a determination that there is at least one recommended photographed file newly identified in the photo library since the last time that the user interface of the social network platform is displayed at the device.

In some embodiments, the device presents the photographed file uploading region (e.g., region 53 in FIG. 5) concurrently with the input region (e.g., region 54 in FIG. 5) for entering status updates of the user account in the user interface in accordance with a determination that there is at least one new photographed file in the photo library with a photographing location that is not a regular location associated with the user and a photographing time that is later than the last time that the user interface of the social network platform was displayed at the device.

In some embodiments, the device presents the photographed file uploading region (e.g., region 53 in FIG. 5) concurrently with the input region (e.g., region 54 in FIG. 5) for entering status updates of the user account in the user interface in accordance with a determination that there is at least a threshold number of new photographed files in the photo library with a common photographing location that is a regular location associated with the user and respective photographing times that is less than a threshold amount of time apart from one another since the last time that the user interface of the social network platform was displayed at the device.

In some embodiments, the device presents the photographed file uploading region (e.g., region 53 in FIG. 5) concurrently with the input region (e.g., region 54 in FIG. 5) for entering status updates of the user account in the user interface in accordance with a determination that there is at least one new photographed files in the photo library with a common photographing location that is a location mentioned in the status updates shown in the user interface of the social network platform. (In some embodiments, when the user scrolls through the status updates in the user interface, and the device detects that a location is mentioned in the status updates currently displayed in the user interface, the photographed file uploading region is displayed and includes recommended photos that has a common photographing location related to (e.g., proximity to, identical to, including, or similar to)) the location mentioned in the status updates currently displayed in the user interface. In some embodiments, the device ceases to display the uploading region and the recommended photos if the user continues to scroll the status updates in the user interface without interacting with the uploading region and the status update including the location ceases to be visible on the display).

Other details of the method are disclosed with respect to various embodiments described herein, and are not repeated here in the interest of brevity.

Figure 6:
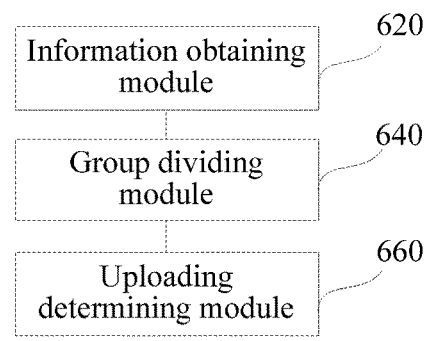
FIG. 6 is a structural block diagram of an apparatus for uploading a photographed file according to an embodiment of the present disclosure.

Referring to FIG. 6, a structural block diagram of an apparatus for uploading a photographed file according to an embodiment of the present disclosure is shown in FIG. 6. The apparatus may be implemented as a part or the whole of a mobile terminal by means of software, hardware, or a combination thereof. The apparatus may include: an information obtaining module 620, a group dividing module 640, and an uploading determining module 660.

The information obtaining module 620 is configured to obtain attribute information of several photographed files generated in a first time period, the attribute information including photographing time and a photographing location.

The group dividing module 640 is configured to divide the photographed files into at least one group according to the attribute information, each group corresponding to one photographing event.

The uploading determining module 660 is configured to determine the photographed file corresponding to the photographing event as a to-be-uploaded photographed file.

Based on the above, the apparatus for uploading a photographed file provided in this embodiment groups photographed files, and determines a photographed file corresponding to a photographing event corresponding to a group as a to-be-uploaded photographed file, so as to resolve the problem that the probability of uploading a photographed file is relatively low because of the problem in the related technology that the operation process of uploading a photographed file is relatively complex, and the efficiency of human computer interaction is relatively low, and simplify the operation process of uploading the photographed file, thereby improving the efficiency of uploading the photographed file by a user.

Figure 7:
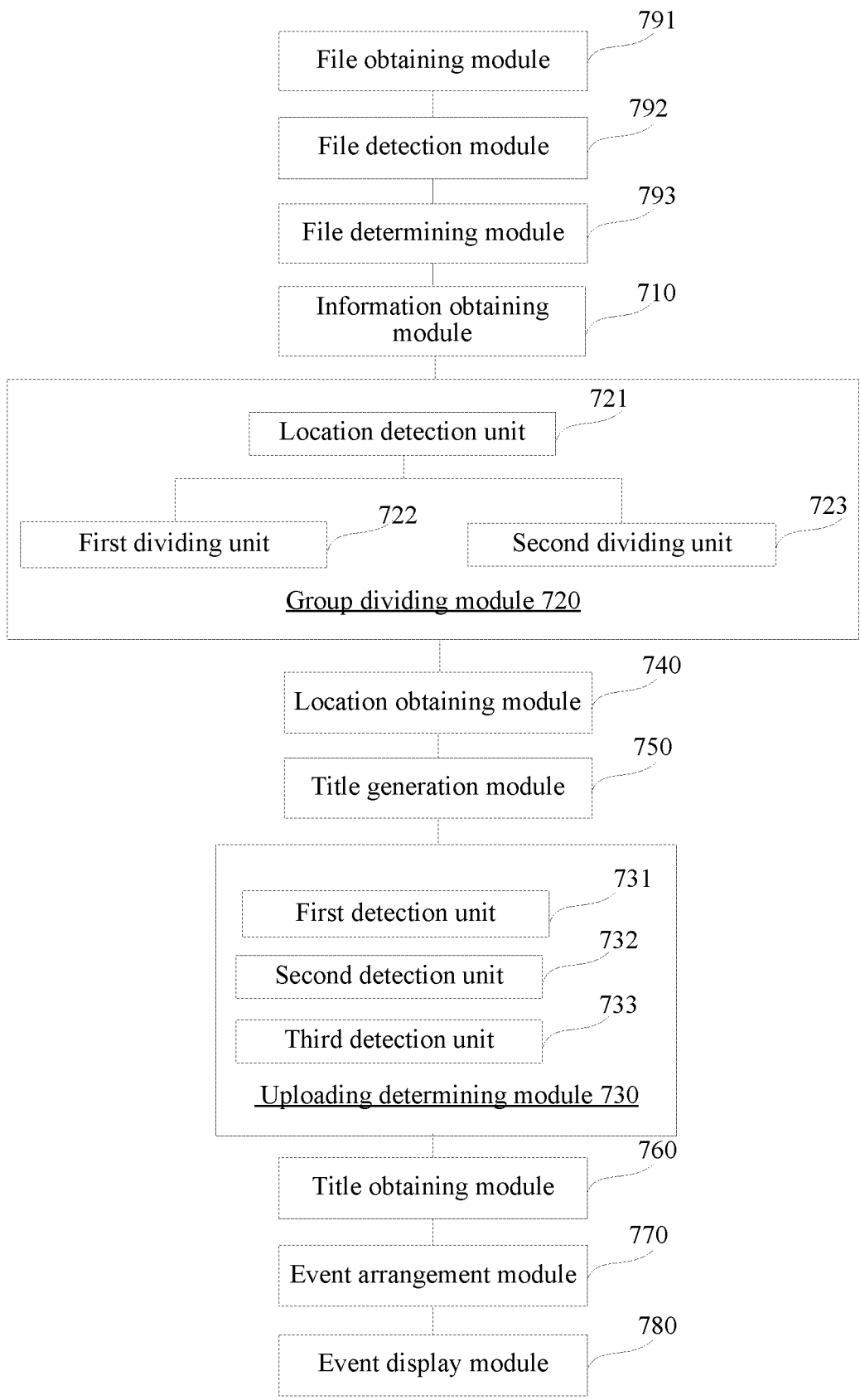
FIG. 7 is a structural block diagram of an apparatus for uploading a photographed file according to another embodiment of the present disclosure.

Referring to FIG. 7, a structural block diagram of an apparatus for uploading a photographed file according to another embodiment of the present disclosure is shown in FIG. 7. The apparatus may be implemented as a part or the whole of a mobile terminal by means of software, hardware, or a combination thereof. The apparatus may include: an information obtaining module 710, a group dividing module 720, and an uploading determining module 730.

The information obtaining module 710 is configured to obtain attribute information of several photographed files generated in a first time period, the attribute information including photographing time and a photographing location.

The group dividing module 720 is configured to divide the photographed files into at least one group according to the attribute information, each group corresponding to one photographing event.

As a possible implementation, the group dividing module 720 may include: a location detection unit 721 and a first dividing unit 722.

The location detection unit 721 is configured to detect whether the photographing location of each photographed file is a regular location of the mobile terminal.

The first dividing unit 722 is configured to: if the photographing location is not the regular location, divide the photographed files whose photographing locations are not the regular location and having a same photographing location into a same group.

As another possible implementation, the group dividing module 720 may include: a location detection unit 721 and a second dividing unit 723.

The second dividing unit 723 is configured to: if the photographing location is the regular location, divide the photographed files whose photographing locations are the regular location and whose photographing time belongs to a same second time period into a same group, where the second time period is less than the first time period.

The uploading determining module 730 is configured to determine the photographed file corresponding to the photographing event as a to-be-uploaded photographed file.

As a first possible implementation, the uploading determining module 730 includes a first detection unit 731.

The first detection unit 731 is configured to detect whether the number of photographed files corresponding to the photographing event is greater than a first threshold; and if yes, determine the photographed files corresponding to the photographing event as the to-be-uploaded photographed files.

As a second possible implementation, the uploading determining module 730 includes a second detection unit 732.

The second detection unit 732 is configured to detect whether the number of unexposed photographed files corresponding to the photographing event is greater than a second threshold; and if yes, determine the photographed files corresponding to the photographing event as the to-be-uploaded photographed files, where the unexposed photographed files include at least one of: photographed files that have not been displayed on the mobile terminal, photographed files that have been determined and have not been viewed, or photographed files that have not been determined as the to-be-uploaded photographed files.

As a third possible implementation, the uploading determining module 730 includes a third detection unit 733.

The third detection unit 733 is configured to detect whether the number of non-uploaded photographed files corresponding to the photographing event is greater than a third threshold; and if yes, determine the photographed files corresponding to the photographing event as the to-be-uploaded photographed files.

As a possible implementation, the apparatus further includes a location obtaining module 740 and a title generation module 750.

The location obtaining module 740 is configured to obtain photographing time and a photographing location that correspond to each photographed file in the group.

The title generation module 750 is configured to generate an event title of the photographing event corresponding to the group according to the photographing time and the photographing location, where the event title includes: an event location and event time, and the event time is the photographing time or holiday information corresponding to the photographing time.

As a possible implementation, the apparatus further includes: a title obtaining module 760, an event arrangement module 770, and an event display module 780.

The title obtaining module 760 is configured to obtain the event title corresponding to the photographing event.

The event arrangement module 770 is configured to sequentially arrange the several photographing events into a photographing event queue in a preset sequence according to the event time in the event title.

The event display module 780 is configured to display first N photographing events in the photographing event queue, where N is a positive integer.

As a possible implementation, the apparatus further includes: a file obtaining module 791, a file detection module 792, and a file determining module 793.

The file obtaining module 791 is configured to obtain file sizes and file parameters of several files that meet a preset file type and that are generated, by the mobile terminal, in the first time period.

The file detection module 792 is configured to detect whether the file sizes and/or the file parameters meet a preset condition. The preset condition includes that the file sizes are greater than a preset size and/or a field of the photographing time exists in the file parameters.

The file determining module 793 is configured to determine the files as photographed files if the file sizes and/or the file parameters meet the preset condition.

Based on the above, the apparatus for uploading a photographed file provided in this embodiment groups photographed files, and determines a photographed file corresponding to a photographing event corresponding to a group as a to-be-uploaded photographed file, so as to resolve the problem in the related technology that the operation process of uploading a photographed file is relatively complex, and the efficiency of human computer interaction is relatively low, and simplify the operation process of uploading the photographed file, thereby improving the efficiency of uploading the photographed file by a user.

In addition, photographed files whose photographing locations are not the regular location and having a same photographing location are divided into a same group, so as to improve the efficiency of sorting out photographed files by the user, thereby facilitating uploading the sorted out photographed files by the user, and simplifying the operation process of uploading the photographed files.

In addition, corresponding event titles are generated for different photographing events, so as to help the user recover memories of the corresponding photographed files in the photographing events, thereby facilitating improving the probability of uploading photographed files by the user.

Figure 8:
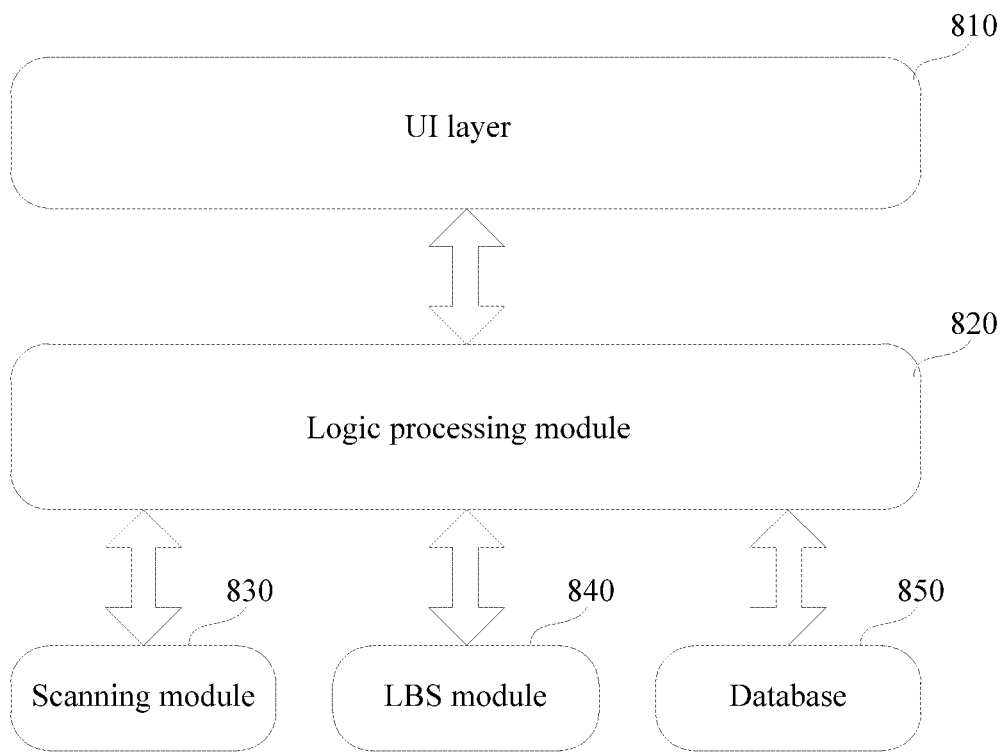
FIG. 8 is a schematic architectural diagram of a mobile terminal according to an embodiment of the present disclosure.

Referring to FIG. 8, a schematic architectural diagram of a mobile terminal 800 according to an embodiment to present disclosure is shown in FIG. 8.

A user interface (UI) layer 810 in the architecture of the mobile terminal 800 shown in FIG. 8 may include the event display module 780 in the embodiment shown in FIG. 7. A logic processing module 820 may include the group dividing module 720, the uploading determining module 730, the title generation module 750, the event arrangement module 770, the file detection module 792 and the file determining module 793 in the embodiment shown in FIG. 7. A scanning module 830 may include the information obtaining module 710 and the file obtaining module 791 in the embodiment shown in FIG. 7. A location based service (LBS) module 840 may include the location obtaining module 740 in the embodiment shown in FIG. 7. A database 850 may include the title obtaining module 760 in the embodiment shown in FIG. 7.

The UI layer 810 is configured to display a photographing event. The logic processing module 820 is configured to group photographed files and send a corresponding photographing event after grouping to the UI layer for display, and is also configured to communicate with the LBS module and update grouped photographed files into the database. The scanning module 830 is configured to obtain photographed files and files meeting a preset file type in a mobile terminal. The LBS module 840 is configured to obtain photographing locations of the photographed files and a regular location of the mobile terminal. The database 850 is configured to store groups of the photographed files and corresponding photographing events.

Figure 9:
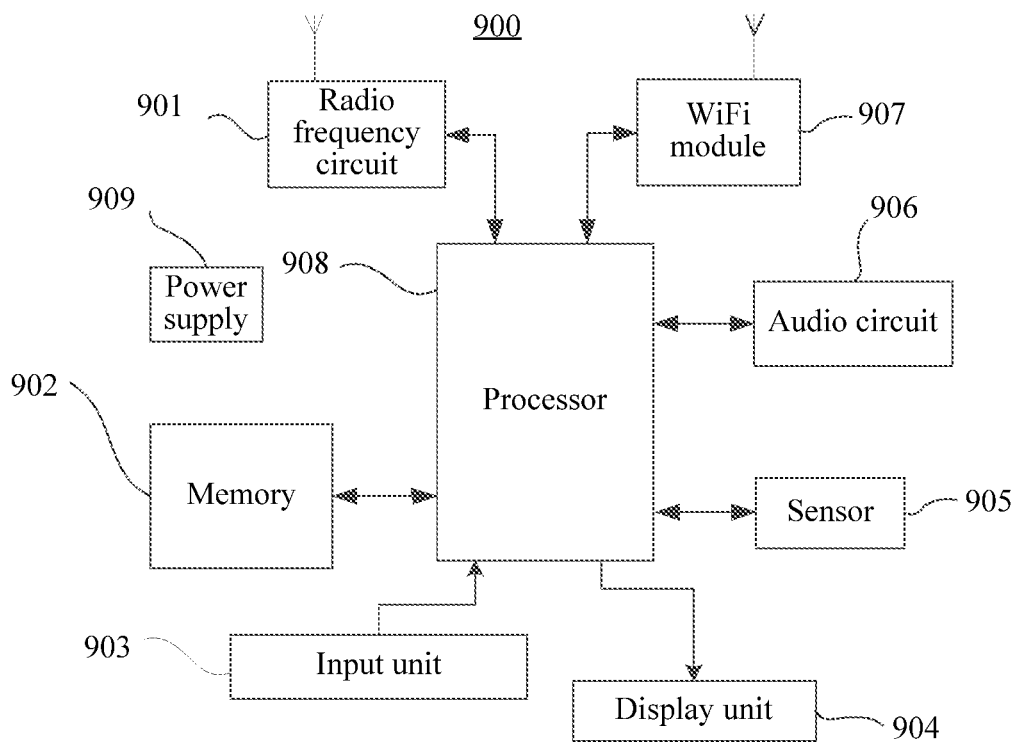
FIG. 9 is a block diagram of a mobile terminal according to an embodiment of the present disclosure.

Referring to FIG. 9, FIG. 9 is a block diagram of a mobile terminal 900 according to an embodiment of the present disclosure. The mobile terminal may include components such as a radio frequency (RF) circuit 901, a memory 902 including one or more computer readable storage media, an input unit 903, a display unit 904, a sensor 905, an audio circuit 906, a wireless fidelity (WiFi) module 907, a processor 908 including one or more processing cores, and a power supply 909. A person skilled in the art may understand that the structure of the mobile terminal shown in FIG. 9 does not constitute a limitation to the mobile terminal, and the mobile terminal may include more components or fewer components than those shown in the figure, or some components may be combined, or a different component deployment may be used.

The RF circuit 901 may be configured to receive and send signals during an information receiving and sending process or a call process. Particularly, the RF circuit 901 receives downlink information from a base station, then delivers the downlink information to one or more processors 908 for processing, and sends related uplink data to the base station. Generally, the RF circuit 901 includes, but is not limited to: an antenna, at least one amplifier, a tuner, one or more oscillators, a subscriber identity module (SIM) card, a transceiver, a coupler, a low noise amplifier (LNA), and a duplexer. In addition, the RF circuit 901 may also communicate with a network and another device by wireless communication. The wireless communication may use any communication standard or protocol, which includes, but is not limited to, Global System of Mobile communication (GSM), General Packet Radio Service (GPRS), Code Division Multiple Access (CDMA), Wideband Code Division Multiple Access (WCDMA), Long Term Evolution (LTE), email, and Short Messaging Service (SMS).

The memory 902 may be configured to store a software program and module. The processor 908 runs the software program and module stored in the memory 902, to implement various functional applications and data processing. The memory 902 may mainly include a program storage area and a data storage area. The program storage area may store an operating system, an application program required by at least one function (such as a sound playback function and an image display function), and the like. The data storage area may store data (such as audio data and an address book) created according to use of the mobile terminal, and the like. In addition, the memory 902 may include a high speed random access memory, and may also include a non-volatile memory, such as at least one magnetic disk storage device, a flash memory, or another volatile solid-state storage device. Correspondingly, the memory 902 may further include a memory controller, to provide access of the processor 908 and the input unit 903 to the memory 902.

The input unit 903 may be configured to receive input digit or character information, and generate a keyboard, mouse, joystick, optical, or track ball signal input related to the user setting and function control. Specifically, in a specific embodiment, the input unit 903 may include a touch-sensitive surface and another input device. The touch-sensitive surface, which may also be referred to as a touch-screen or a touch panel, may collect a touch operation of a user on or near the touch-sensitive surface (such as an operation of a user on or near the touch-sensitive surface by using any suitable object or accessory such as a finger or a stylus), and drive a corresponding connection apparatus according to a preset program. In some embodiments, the touch-sensitive surface may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 908. Moreover, the touch controller can receive and execute a command sent by the processor 908. In addition, the touch-sensitive surface may be implemented in multiple types, such as a resistive type, a capacitive type, an infrared type, and a surface acoustic wave type. In addition to the touch-sensitive surface, the input unit 903 may further include another input device. Specifically, the another input device may include but is not limited to one or more of a physical keyboard, a function key (for example, a volume control key or a power on/off key), a trackball, a mouse, or a joystick.

The display unit 904 may be configured to display information input by the user or information provided for the user, and various graphical user interfaces of the mobile terminal. The graphical user interfaces may be formed by a graph, a text, an icon, a video, or any combination thereof. The display unit 904 may include a display panel. In some embodiments, the display panel may be configured in a form of a liquid crystal display (LCD), an organic light-emitting diode (OLED), or the like. Further, the touch-sensitive surface may cover the display panel. After detecting a touch operation on or near the touch-sensitive surface, the touch-sensitive surface transfers the touch operation to the processor 908 to determine the type of a touch event, and then the processor 908 provides corresponding visual output on the display panel according to the type of the touch event. Although in FIG. 9, the touch-sensitive surface and the display panel are used as two separate parts to implement input and output functions, in some embodiments, the touch-sensitive surface and the display panel may be integrated to implement the input and output functions.

The mobile terminal may further include at least one sensor 905 such as an optical sensor, a motion sensor, and other sensors. Specifically, the light sensor may include an ambient light sensor and a proximity sensor. The ambient light sensor may adjust luminance of the display panel according to brightness of the ambient light. The proximity sensor may switch off the display panel and/or backlight when the mobile terminal is moved to the ear. As one type of motion sensor, a gravity acceleration sensor may detect magnitude of accelerations in various directions (which generally are triaxial), may detect magnitude and a direction of the gravity when static, and may be used for an application that recognizes the attitude of the mobile phone (for example, switching between landscape orientation and portrait orientation, a related game, and magnetometer attitude calibration), and a function related to vibration recognition (such as a pedometer and a knock). Other sensors, such as a gyroscope, a barometer, a hygrometer, a thermometer, and an infrared sensor, which may be configured in the mobile terminal are not further described herein.

The audio circuit 906, a speaker, and a microphone may provide audio interfaces between the user and the mobile terminal. The audio circuit 906 may convert received audio data into an electric signal and transmit the electric signal to the speaker. The speaker converts the electric signal into a sound signal for output. On the other hand, the microphone converts a collected sound signal into an electric signal. The audio circuit 906 receives the electric signal and converts the electric signal into audio data, and outputs the audio data to the processor 908 for processing. Then, the processor 908 sends the audio data to, for example, another mobile terminal by using the RF circuit 901, or outputs the audio data to the memory 902 for further processing. The audio circuit 906 may further include an earphone jack, so as to provide communication between a peripheral earphone and the mobile terminal.

WiFi is a short distance wireless transmission technology. The mobile terminal may help, by using the WiFi module 907, the user to receive and send emails, browse a web page, access streaming media, and so on, which provides wireless broadband Internet access for the user. Although FIG. 9 shows the WiFi module 907, it may be understood that the WiFi module 907 is not a necessary component of the mobile terminal, and when required, the WiFi module may be omitted as long as the scope of the essence of the present disclosure is not changed.

The processor 908 is a control center of the mobile terminal, and is connected to various parts of the entire mobile phone by using various interfaces and lines, and by running or executing a software program and/or module stored in the memory 902 and calling data stored in the memory 902, to perform various functions of the mobile terminal and process data, so as to perform overall monitoring on the mobile phone. In some embodiments, the processor 908 may include one or more processing cores. Preferably, the processor 908 may integrate an application processor and a modem. The application processor mainly processes an operating system, a user interface, an application program, and the like. The modem mainly processes wireless communication. It may be understood that the foregoing modem processor may alternatively not be integrated into the processor 908.

The mobile terminal further includes the power supply 909 (such as a battery) for supplying power to the components. Preferably, the power supply may be logically connected to the processor 908 by using a power management system, thereby implementing functions such as charging, discharging and power consumption management by using the power management system. The power supply 909 may further include one or more of a direct current or alternating current power supply, a re-charging system, a power failure detection circuit, a power supply converter or inverter, a power supply state indicator, and any other components.

Although not shown in the figure, the mobile terminal may further include a camera, a Bluetooth module, and the like. Details are not described herein again. Specifically, in this embodiment, the memory stores at least one instruction, at least one program, a code set, or an instruction set. The at least one instruction, the at least one program, the code set, or the instruction set are loaded and executed by the processor to implement the method for uploading a photographed file in the foregoing method embodiments.

A person of ordinary skill in the art may understand that all or some of the steps of the methods in the foregoing embodiments may be implemented by using program instructions and relevant hardware. The program may be stored in a computer readable storage medium. The storage medium may include: a read only memory (ROM), a random access memory (RAM), a magnetic disk, an optical disc, or the like. In other words, the storage medium stores at least one instruction, at least one program, a code set, or an instruction set. The at least one instruction, the at least one program, the code set, or the instruction set are loaded and executed by the processor to implement the method for uploading a photographed file in the foregoing method embodiments.

It should be noted that the above functional modules are only described for exemplary purposes when the apparatus for uploading a photographed file provided in the foregoing embodiment uploads a photographed file. In actual applications, the functions may be allocated to different functional modules according to specific needs, which means that the internal structure of the mobile terminal is divided to different functional modules to complete all or some of the above described functions. In addition, the apparatus for uploading a photographed file provided in the foregoing embodiment is based on the same concept as the embodiment of the method for uploading a photographed file. For the specific implementation process, refer to the method embodiment, and the details are not described herein again.

The sequence numbers of the foregoing embodiments of the present disclosure are merely for the convenience of description, and do not imply the preference among the embodiments.

The foregoing descriptions are merely preferred embodiments of the present disclosure, but are not intended to limit the present disclosure. Any modification, equivalent replacement, or improvement made within the spirit and principle of the present disclosure shall fall within the protection scope of the present disclosure.

What is claimed is:

1. A method for uploading a photographed file to a social network platform, comprising:
at a device having one or more processors and memory:
displaying a user interface of the social network platform, wherein the user interface includes status updates of a plurality of users associated with a user account corresponding to the device, and the user interface includes a photographed file uploading region and an input region for entering status updates of the user account; and
presenting one or more recommended photographed files for upload to the social network platform as status updates in the photographed file uploading region in the user interface of the social network platform, wherein the one or more recommended photographed files are selected from a photo library on the device through a plurality of operations performed by the device prior to a time that the user interface is displayed at the device and wherein the operations include:
dividing a plurality of photographed files generated in a first time period into one or more groups based on photographing location and photographing time, including:
in accordance with a determination that a photographing location of a first respective photographed file is not a regular location associated with a user of the device, grouping the first respective photographed file with one or more other first photographed files in accordance with a common photographing location of the first respective photographed file and the one or more other first photographed files;
in accordance with a determination that a photographing location of a second respective photographed file is a regular location associated with the user of the device, grouping the second respective photographed file with one or more other second photographed files in accordance with a common photographing time of the second respective photographed file and the one or more other second photographed files, wherein a time period associated with the common photographing time is selected as one of multiple preset time granularities that produces a biggest reduction of the resulting number of groups when changed from an adjacent preset time granularity; and
generating a respective event title for each of the one or more groups based on the common photographing location and the common photographing time associated with the group, the event title including an event location and an event time;
arranging the one or more groups into a queue of photographing events according to their respective event times in a reverse time order, each photographing event having an associated set of recommended photographed files and a corresponding event title;
displaying a top N of the queue of photographing events and their associated event titles in the photographed file uploading region in the user interface concurrently with the input region for entering status updates of the user account;
uploading, to the server, (i) a photographing event and its associated event title selected by the user; and (ii) a status update provided by the user for publishing on the social network platform.

2. The method of claim 1, wherein selecting at least one photographed file from at least one of the one or more groups include:
for a first group of the photographed files that are grouped based on a common photographing location, selecting a recommended photographed file from the first group of photographed files without consideration of the photographing time; and
for a second group of the photographed files that are grouped based on a common photographing time, selecting a recommended photographed file from the second group of the photographed files only if the second group of photographed files meet preset recommendation criteria that include a requirement on the photographing time of the second group of photographed files.

3. The method of claim 1, including:
presenting the photographed file uploading region concurrently with the input region for entering status updates of the user account in the user interface in accordance with a determination that there is at least one recommended photographed file newly identified in the photo library since the last time that the user interface of the social network platform is displayed at the device.

4. The method of claim 1, including:
presenting the photographed file uploading region concurrently with the input region for entering status updates of the user account in the user interface in accordance with a determination that there is at least one new photographed file in the photo library with a photographing location that is not a regular location associated with the user and a photographing time that is later than the last time that the user interface of the social network platform was displayed at the device.

5. The method of claim 1, including:
presenting the photographed file uploading region concurrently with the input region for entering status updates of the user account in the user interface in accordance with a determination that there is at least a threshold number of new photographed files in the photo library with a common photographing location that is a regular location associated with the user and respective photographing times that is less than a threshold amount of time apart from one another since the last time that the user interface of the social network platform was displayed at the device.

6. The method of claim 1, including:
presenting the photographed file uploading region concurrently with the input region for entering status updates of the user account in the user interface in accordance with a determination that there is at least one new photographed files in the photo library with a common photographing location that is a location mentioned in the status updates shown in the user interface of the social network platform.

7. A device, comprising:
one or more processors;
memory;
a display; and
a plurality of instructions stored in the memory that, when executed by the one or more processors, cause the one or more processors to perform the following operations:
  displaying a user interface of the social network platform, wherein the user interface includes status updates of a plurality of users associated with a user account corresponding to the device, and the user interface includes a photographed file uploading region and an input region for entering status updates of the user account; and
  presenting one or more recommended photographed files for upload to the social network platform as status updates in the photographed file uploading region in the user interface of the social network platform, wherein the one or more recommended photographed files are selected from a photo library on the device by the device prior to a time that the user interface is displayed at the device, wherein the selecting includes:
    dividing a plurality of photographed files generated in a first time period into one or more groups based on photographing location and photographing time, including:
      in accordance with a determination that a photographing location of a first respective photographed file is not a regular location associated with a user of the device, grouping the first respective photographed file with one or more other first photographed files in accordance with a common photographing location of the first respective photographed file and the one or more other first photographed files, wherein a time period associated with the common photographing time is selected as one of multiple preset time granularities that produces a biggest reduction of the resulting number of groups when changed from an adjacent preset time granularity;
      in accordance with a determination that a photographing location of a second respective photographed file is a regular location associated with the user of the device, grouping the second respective photographed file with one or more other second photographed files in accordance with a common photographing time of the second respective photographed file and the one or more other second photographed files; and
    generating a respective event title for each of the one or more groups based on the common photographing location and the common photographing time associated with the group, the event title including an event location and an event time;
    arranging the one or more groups into a queue of photographing events according to their respective event times in a reverse time order, each photographing event having an associated set of recommended photographed files and a corresponding event title;
    displaying a top N of the queue of photographing events and their associated event titles in the photographed file uploading region in the user interface concurrently with the input region for entering status updates of the user account;
    uploading, to the server, (i) a photographing event and its associated event title selected by the user; and (ii) a status update provided by the user for publishing on the social network platform.

8. The device of claim 7, wherein selecting at least one photographed file from at least one of the one or more groups include:
  for a first group of the photographed files that are grouped based on a common photographing location, selecting a recommended photographed file from the first group of photographed files without consideration of the photographing time; and
  for a second group of the photographed files that are grouped based on a common photographing time, selecting a recommended photographed file from the second group of the photographed files only if the second group of photographed files meet preset recommendation criteria that include a requirement on the photographing time of the second group of photographed files.

9. The device of claim 7, wherein the operations include:
presenting the photographed file uploading region concurrently with the input region for entering status updates of the user account in the user interface in accordance with a determination that there is at least one recommended photographed file newly identified in the photo library since the last time that the user interface of the social network platform is displayed at the device.

10. The device of claim 7, wherein the operations include:
presenting the photographed file uploading region concurrently with the input region for entering status updates of the user account in the user interface in accordance with a determination that there is at least one new photographed file in the photo library with a photographing location that is not a regular location associated with the user and a photographing time that is later than the last time that the user interface of the social network platform was displayed at the device.

11. The device of claim 7, wherein the operations include:
presenting the photographed file uploading region concurrently with the input region for entering status updates of the user account in the user interface in accordance with a determination that there is at least a threshold number of new photographed files in the photo library with a common photographing location that is a regular location associated with the user and respective photographing times that is less than a threshold amount of time apart from one another since the last time that the user interface of the social network platform was displayed at the device.

12. The device of claim 7, wherein the operations include:
presenting the photographed file uploading region concurrently with the input region for entering status updates of the user account in the user interface in accordance with a determination that there is at least one new photographed files in the photo library with a common photographing location that is a location mentioned in the status updates shown in the user interface of the social network platform.

13. A non-transitory computer-readable storage medium storing a plurality of instructions configured for execution by a device having one or more processors and a display, wherein the plurality of instructions cause the device to perform the following operations:

displaying a user interface of the social network platform, wherein the user interface includes status updates of a plurality of users associated with a user account corresponding to the device, and the user interface includes a photographed file uploading region and an input region for entering status updates of the user account; and presenting one or more recommended photographed files for upload to the social network platform as status updates in the photographed file uploading region in the user interface of the social network platform, wherein the one or more recommended photographed files are selected from a photo library on the device by the device prior to a time that the user interface is displayed at the device, wherein the selecting includes:

dividing a plurality of photographed files generated in a first time period into one or more groups based on photographing location and photographing time, including:

in accordance with a determination that a photographing location of a first respective photographed file is not a regular location associated with a user of the device, grouping the first respective photographed file with one or more other first photographed files in accordance with a common photographing location of the first respective photographed file and the one or more other first photographed files;

in accordance with a determination that a photographing location of a second respective photographed file is a regular location associated with the user of the device, grouping the second respective photographed file with one or more other second photographed files in accordance with a common photographing time of the second respective photographed file and the one or more other second photographed files, wherein a time period associated with the common photographing time is selected as one of multiple preset time granularities that produces a biggest reduction of the resulting number of groups when changed from an adjacent preset time granularity; and generating a respective event title for each of the one or more groups based on the common photographing location and the common photographing time associated with the group, the event title including an event location and an event time;

arranging the one or more groups into a queue of photographing events according to their respective event times in a reverse time order, each photographing event having an associated set of recommended photographed files and a corresponding event title;

displaying a top N of the queue of photographing events and their associated event titles in the photographed file uploading region in the user interface concurrently with the input region for entering status updates of the user account;

uploading, to the server, (i) a photographing event and its associated event title selected by the user; and (ii) a status update provided by the user for publishing on the social network platform.

14. The non-transitory computer-readable medium of claim 13, wherein selecting at least one photographed file from at least one of the one or more groups include:

for a first group of the photographed files that are grouped based on a common photographing location, selecting a recommended photographed file from the first group of photographed files without consideration of the photographing time; and for a second group of the photographed files that are grouped based on a common photographing time, selecting a recommended photographed file from the second group of the photographed files only if the second group of photographed files meet preset recommendation criteria that include a requirement on the photographing time of the second group of photographed files.

15. The non-transitory computer-readable medium of claim 13, wherein the operations include:

presenting the photographed file uploading region concurrently with the input region for entering status updates of the user account in the user interface in accordance with a determination that there is at least one recommended photographed file newly identified in the photo library since the last time that the user interface of the social network platform is displayed at the device.

16. The non-transitory computer-readable medium of claim 13, wherein the operations include:

presenting the photographed file uploading region concurrently with the input region for entering status updates of the user account in the user interface in accordance with a determination that there is at least one new photographed file in the photo library with a photographing location that is not a regular location associated with the user and a photographing time that is later than the last time that the user interface of the social network platform was displayed at the device.

17. The non-transitory computer-readable medium of claim 13, wherein the operations include:

presenting the photographed file uploading region concurrently with the input region for entering status updates of the user account in the user interface in accordance with a determination that there is at least a threshold number of new photographed files in the photo library with a common photographing location that is a regular location associated with the user and respective photographing times that is less than a threshold amount of time apart from one another since the last time that the user interface of the social network platform was displayed at the device.

* * * * *